Feb. 5, 1924. 1,482,542
W. J. BUETTNER
BUSHING FOR TUBULAR RADIATORS
Filed April 17, 1922
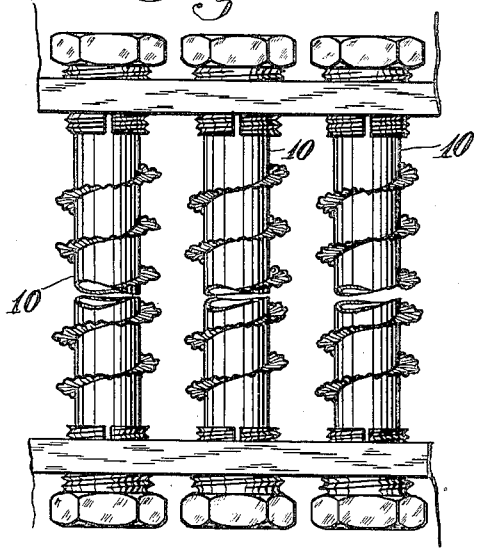
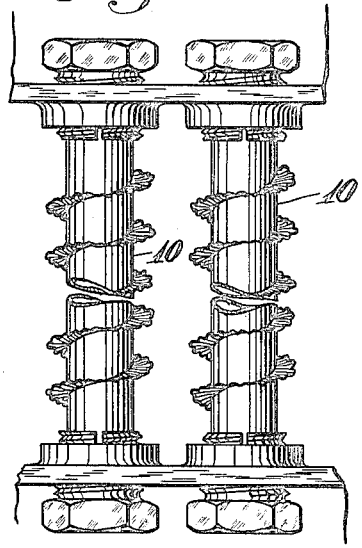
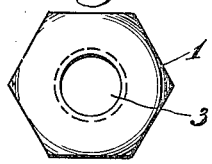
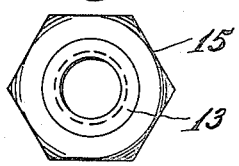
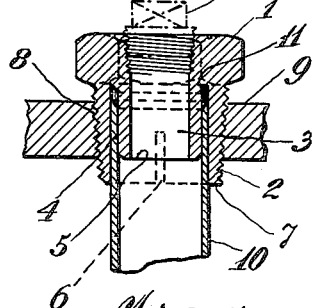
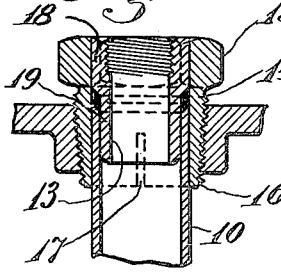
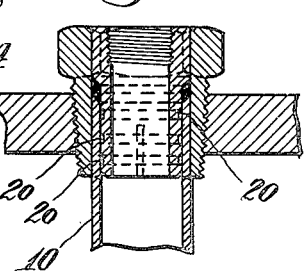
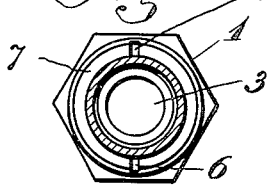
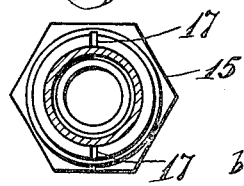
INVENTOR.
William J. Buettner
by
Attorneys Patented Feb. 5, 1924.

1,482,542

UNITED STATES PATENT OFFICE.

WILLIAM J. BUETTNER, OF CARNEGIE, PENNSYLVANIA.

BUSHING FOR TUBULAR RADIATORS.

Application filed April 17, 1922. Serial No. 554,011.

*To all whom it may concern:*

Be it known that I, WILLIAM J. BUETT-NER, a citizen of the United States, residing at Carnegie, in the county of Allegheny and State of Pennsylvania, have invented certain new and useful Improvements in Bushings for Tubular Radiators, of which the following is a specification.

This invention relates to tube bushings and more in particular to bushings used in connection with tubular radiators for self-propelled vehicles.

One of the principal objects is to provide a bushing which will enable the assembling of the cooling-tubes of a radiator without requiring the use of solder. A further object is to provide means for replacing a defective or damaged radiator-tube without removing the surrounding tubes. Still a further object is to provide means for the expansion and contraction of the cooling tubes, due to heat or to jolts. Further objects and advantages of my invention will appear from the description and drawings which form a part of this application.

In the drawings:

Fig. 1 is a fragmentary view of a radiator showing my method of assembling the cooling-tubes in the upper and lower end-plates of the radiator.

Fig. 2 is a view similar to Fig. 1, excepting that the end-plates are made thinner and are provided with bosses for each cooling-tube.

Fig. 3 is a cross-section showing a tube-bushing made in one piece.

Fig. 4 is a top view corresponding to Fig. 3.

Fig. 5 is a bottom view of Fig. 3.

Fig. 6 is a cross-section showing a bushing made in two pieces.

Fig. 7 is a cross-section showing a modified construction of a two-piece tube-bushing.

Fig. 8 is a top view corresponding to Figures 6 and 7.

Fig. 9 is a bottom view corresponding to Figures 6 and 7.

Referring to Figures 3 to 5, my one-piece tube-bushing consists of a polygonal head 1 provided with an outwardly threaded shank 2, preferably made slightly conic. A central hole 3 is drilled through the head and shank and the latter is further partly counterbored to form a concentric groove 4 thus producing within the shank a depending sleeve portion 5. One or more slots 6 are cut through the outer shell 7 of the shank, to give the latter a certain resiliency when it is screwed tightly into the suitably drilled and tapped hole 8 of the end-plate 9. Each end of the radiator-tube 10 is inserted in the groove 4 of a tube-bushing and the tube is held tight therein by the clamping effect of the slotted shells as the bushings are screwed into the end-plates. The bottom of the groove 4 is preferably beveled, as shown by numeral 11, and the ends of each radiator-tube are correspondingly beveled inwardly so that when the tube ends reach the bottom of the grooves, the tubes will be expanded outwardly, thus increasing the tightness of the contact between said tubes and bushings. The upper part of the central hole 3 is preferably tapped to receive a pipe plug 12 which is used for quickly cutting out a damaged or leaky tube, when it is impossible to make a complete repair for lack of time or material.

The modified construction shown in Figures 6-8 and 9 differs from the construction just described in that the inner sleeve 13 is made separate and is then force-driven in the outer shell-member 14 which is provided with a polygonal head 15 and a tapered and threaded shell 16 having suitable slots 17 to render the former resilient. The inner sleeve 13 consists of an enlarged part 18 fitting tightly within the outer shell and a reduced part 19 which provides the groove-space necessary for the insertion of the cooling tube 10. The shoulder formed by the parts 18 and 19 is beveled to fit the inwardly beveled end of the tube, for a purpose stated above.

In Fig. 7 is illustrated a slight modification of the two-part tube-bushing described in the foregoing paragraph. The difference consists in that the inner sleeve has been lengthened and provided with a plurality of peripheral grooves 20 in order to increase the leak-proofness of the contact between the inner sleeve and the tube. This type of bushing is preferably used in radiators for steam operated self-propelled vehicles, where greater pressures are to be expected in the radiators.

The method of installing or replacing a cooling tube is very simple and is as follows: The tube-bushing is first screwed in the lower end-plate and the tube is then passed through the open hole in the upper end-plate and driven into the lower bushing. The upper bushing is now screwed into the upper end-plate and onto the tube until a tight fit is obtained at both ends of the tube. The tube-ends are generally coated outwardly with white-lead, litharge, or any suitable coating to provide additional insurance against leaks.

To remove a damaged tube, the upper cap of the radiator is first removed to expose the upper bushings of the tubes; the bushing of the damaged tube is now removed and the tube is pulled out of its lower bushing by means of a pull-rod inserted in the tube. The new tube is introduced in the manner described above.

It will be seen from the foregoing description and the drawings that there are no rigid connections between the end-plates and the tubes, as occurs when the tubes are soldered or welded directly to the end-plates. The connections in my construction is frictional only and will allow for expansion or contraction of the radiator tubes without affecting the tightness of the connections or putting undue stresses on the end-plates, which would often cause the breaking of soldered joints.

As will be understood, as suggested herein, there may be slight changes made in the construction and arrangement of the details of my invention without departing from the field and scope of the same, and I intend to include all such variations as fall within the scope of the appended claims, in this application in which the preferred forms only of my invention have been disclosed.

What I claim is:

1. In combination with a tubular radiator, a plurality of tubes; end-plates positioned at each end of said tubes and engaged thereby; a plurality of centrally apertured bushings for securing said tubes in said end-plates; said bushings having two spaced concentric shells for engaging said tubes therebetween, the outer shell being resilient, tapered and threaded outwardly for engagement with said end-plates and smooth and straight inwardly; the inner shell being straight and smooth all over.

2. In combination with a tubular radiator, a plurality of tubes; end-plates positioned at each end of said tubes and engaged thereby; a plurality of centrally apertured bushings for securing said tubes in said end-plates; said bushings having two spaced concentric shells for engaging said tubes therebetween; the outer shell being tapered and threaded outwardly for engagement with said end-plates and smooth and straight inwardly; the inner shell being straight and smooth all over, and longitudinal slots cut through said outer shell.

3. In combination with a tubular radiator, a plurality of tubes; end-plates positioned at each end of said tubes and engaged thereby; a plurality of centrally apertured bushings for securing said bushings in said end-plates; said bushings having a polygonal head and two spaced concentric shells for engaging said tubes therebetween; the outer shell being threaded outwardly for engagement with said end-plates and smooth and straight inwardly; the inner shell being straight and smooth all over, and longitudinal slots cut through said outer shell.

4. In combination with a tubular radiator, a plurality of tubes; end-plates positioned at each end of said tubes and engaged thereby; a plurality of centrally apertured bushings for securing said tubes in said end-plates; said bushings having a polygonal head and two spaced concentric shells for engaging said tubes therebetween; the aperture in said bushing being threaded to receive a sealing plug; the outer shell being threaded outwardly for engagement with said end-plates and smooth and straight inwardly; the inner shell being straight and smooth all over, and longitudinal slots cut through said outer shell.

In testimony whereof I affix my signature.

WILLIAM J. BUETTNER.